Figure 1:
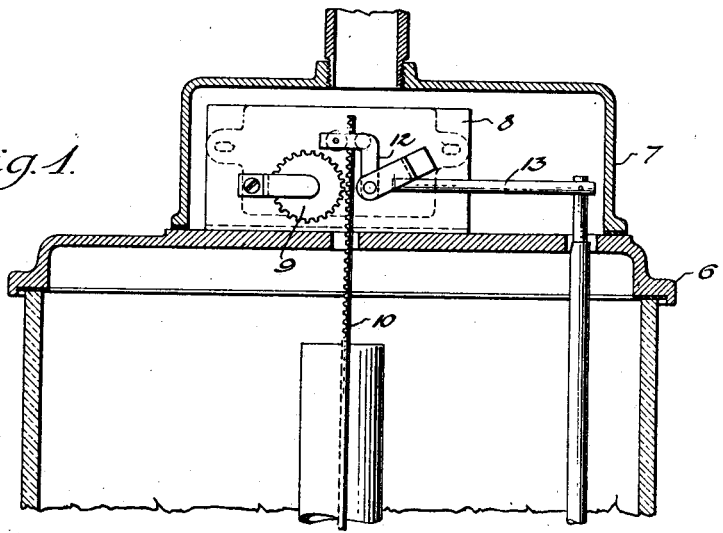

Dec. 30, 1924.

M. LE R. BILLINGS

LIQUID FUEL DISPENSING APPARATUS

Filed Nov. 29, 1922

1,521,070

Inventor:
Marion LeRoy Billings
By Barthel & Barthel
Attorneys

Patented Dec. 30, 1924.

1,521,070

UNITED STATES PATENT OFFICE.

MARION LE ROY BILLINGS, OF ADRIAN, MICHIGAN.

LIQUID-FUEL-DISPENSING APPARATUS.

Application filed November 29, 1922. Serial No. 603,929.

*To all whom it may concern:*

Be it known that I, MARION LE ROY BILLINGS, a citizen of the United States, residing at Adrain, in the county of Lenawee and State of Michigan, have invented certain new and useful Improvements in Liquid-Fuel-Dispensing Apparatus, of which the following is a specification, reference being had therein to the accompanying drawings.

The liquid fuel dispensing apparatus used at service stations ordinarily includes a visible reservoir having air vents, an overflow connection, a fuel inlet connection and outlet connection, a metering device, a float in the reservoir adapted to actuate a metering device during the outflow of fuel, and a valve and valve operating mechanism adapted to control the outflow of fuel and place the metering device in condition to be actuated by the float during the outflow of fuel.

In this type of apparatus the fuel may flow from the reservoir by gravity or be forced therefrom by air under compression, but in both instances a valvular means is adapted to be manually actuated to release a predetermined quantity of fuel and some of the attendants of service stations equipped with these liquid fuel dispensing apparatus have discovered that the outlet valves can be eased off of their seats or slightly actuated, to release fuel, without the metering device being actuated. This fraudulent practice has resulted in many gallons of fuel being removed from reservoirs and unaccounted for by the owners of service stations, and my invention in its broadest aspect, involves a valve and valve operating mechanism by which fuel cannot be surreptitiously removed from the reservoir. To prevent such nefarious practice I have designed a valve and valve operating mechanism articulated relative to a metering device so that initial actuation of either the valve or the valve operating mechanism places the float or meter operating mechanism in condition to immediately actuate the meter at the first instance of the flow of fuel. In other words, the valve which controls the outlet of fuel cannot be eased off of its seat or actuated to the extent of providing any orifice or opening through which gasoline may ooze or flow without positively actuating the metering device of the dispensing apparatus.

Specifically my invention may include an elongated valve or a valve having a skirt, either of which must positively clear an outlet opening and in so doing place the metering device in condition for actuation by the first flow of fuel. Then again, I may resort to a lost motion between a valve and its operating mechanism in order that the valve operating mechanism can place the metering device in condition for operation before the valve is removed from its seat, and since there may be other ways of accomplishing the purpose of my invention, I would have it understood that the constructions to be hereinafter specifically described are simply a fair example of what may be employed for preventing the theft of fuel from liquid fuel dispensing apparatus.

My invention will now be further described by aid of the drawing, wherein—

Figure 2:
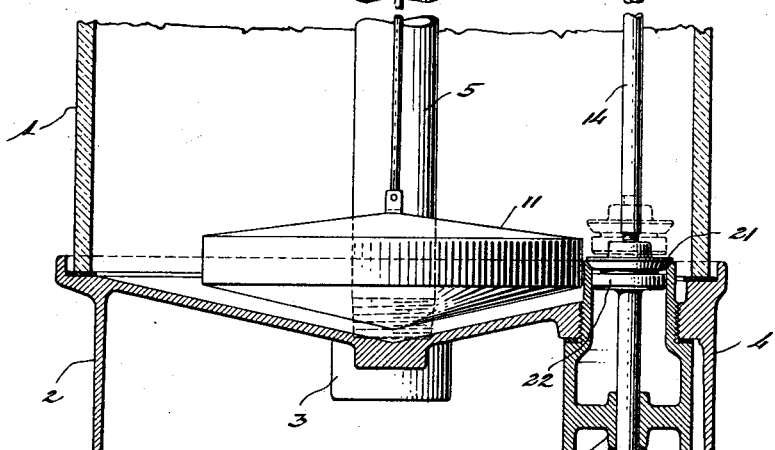
Figure 2:
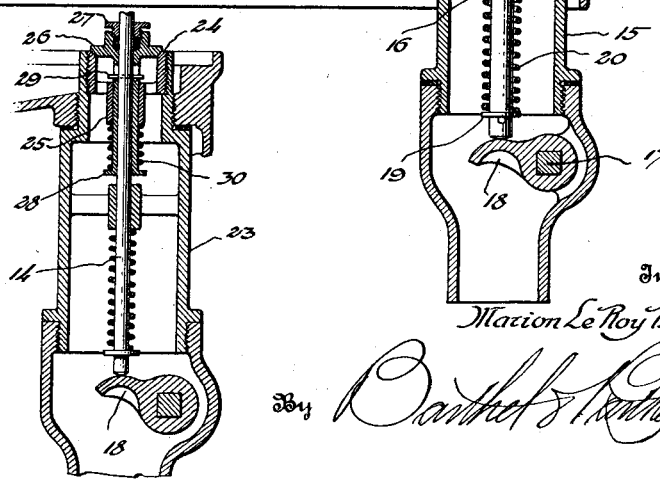

Figure 1 is a vertical sectional view of a conventional form of liquid fuel dispensing apparatus employing one form of valve for preventing fuel from being surreptitiously removed from the apparatus, and Fig. 2 is a detail sectional view of another form of valve or valve operating mechanism that may be used for the same purpose.

In the drawing, the reference numeral 1 denotes a reservoir having a base 2 provided with an inlet connection 3 and an outlet connection 4, said inlet connection having a stand pipe 5 extending in proximity to the top 6 of the reservoir so that said reservoir may receive a large quantity of liquid fuel, for instance gasoline or kerosene. In addition to the connections 3 and 4 there may be overflow, air and vent connections.

7 denotes a casing on the top 6 of the reservoir 1 and in said casing is a conventional form of metering device, generally designated 8. This metering device may be of the recording, registering or indicating type adapted to be actuated by movement of a float in one direction, and as illustrating a suitable float actuating mechanism, I show the metering device as including a rotatable gear or pinion 9 adapted to have movement imparted thereto by a rack 10 movable into and out of engagement with the gear or pinion, said rack having its lower end pivotally attached to the top of a float or buoyant member 11 in the reservoir 1 and adapted to be raised by the inflow of gasoline into the reservoir and lowered by the outflow of gasoline from the reservoir.

Engaging the upper end of the rack pin is a tiltable pivoted guide member 12 adapted to be tilted to shift the rack 10 into or out of engagement with the gear or pinion 9 and engaging the tiltable guide member 12 for this purpose is an arm 13 carried by the upper end of a valve rod 14 extending through the reservoir 1 and axially of the outlet connection 4.

15 denotes a rod guide and valve seat member mounted in the outlet connection 4, said member having a spider or axial guide 16 for the lower portion of the valve rod 14 and in the lower end of the member 15 is journaled a rock shaft 17 provided with a crank 18 engaging the lower end of the valve rod 14 and adapted to be manually rocked or actuated to raise the valve rod 14. On the lower end of the valve rod 14 is an abutment 19 and encircling said valve rod, between the spider 16 and the abutment 19, is a coiled expansion spring 20 holding the lower end of the valve rod normally in engagement with the crank 18 and a valve 21 on said valve rod normally seated on the upper end of the valve seat member 15. Ordinarily the valve 21 is of that type which when initially actuated permits of gasoline to flow from the reservoir 1 into the valve seat member 15 and out of the lower end thereof to the automobile tank to be filled. So far I have described a conventional form of liquid fuel dispensing apparatus and the connections between the valve rod 14 and the metering device 8 are such that an attendant of the apparatus may slightly rock the shaft 17 and ease the valve 21 off of its seat to the extent of permitting a quantity of gasoline within the reservoir 1 to flow therefrom without the metering device 8 being actuated, and it is obvious that in time large quantities of gasoline may be surreptitiously removed from the reservoir.

As pointed out in the beginning my invention aims to eliminate this fraudulent or nefarious practice by changing the valvular construction. Instead of using the ordinary valve 21 I may provide said valve with a skirt, extension, piston or guide portion 22 engaging walls of the valve seat member 15 and preventing the outflow of gasoline until such piston or guide portion 22 clears the valve seat of the member 15. This means that the valve rod 14 must be moved a prescribed distance before gasoline can flow and it is this prescribed movement of the valve rod that positively places the metering device in condition to be operated at the least perceptible fall of the float 11. In other words, the rack 10 is placed in operative engagement with the gear or pinion 9 and the float 11 cannot be lowered without actuating the metering device.

As shown in Fig. 2 I may resort to a lost motion between the valve and the valve rod, such arrangement including a valve seat member 23 interiorly screwthreaded to receive a bushing 24 having a spider guide 25 for the valve rod 14. Slidable on the valve rod 14 is a valve 26 having a stuffing box 27 and a sleeve 28 about the valve rod 14. The sleeve 28 is slotted to receive a transverse pin 29 carried by the valve rod 14, and a spring 30 about the sleeve 28 holds the valve 26 normally seated on the upper end of the bushing 24. Initial movement of the crank 18 shifts the valve rod 14 and places the meter or registering device in condition for actuation by the float 11, this being accomplished without unseating the valve 26. Further actuation of the crank 18 unseats the valve 26 and permits fuel to flow while the meter is being operated to register the amount of fuel removed from the reservoir. It is obvious that the stuffing box 27 prevents leakage around the valve stem 14, and that the valve 26 will be seated, when released, by the expansive force of the spring 30.

While in the drawings there are illustrated the preferred embodiment of my invention, it is to be understood that the structural elements are susceptible to such changes as fall within the scope of the appended claims.

What I claim is:—

1. In a liquid dispensing device having a reservoir and an outlet valve, a registering device, a float in said reservoir, means effecting geared engagement between said float and said metering device during flow of fuel from said reservoir, an outlet valve in said reservoir and valve unseating mechanism independent of and actuating said means prior to the unseating of said valve.

2. In a liquid dispensing device having a reservoir and an outlet valve, a registering device, a float in said reservoir, means effecting geared engagement between said float and said metering device during flow of fuel from said reservoir, an outlet valve in said reservoir, and valve unseating mechanism having lost motion prior to unseating of said valve, said mechanism being independent of and fully actuating said means during such lost motion.

In testimony whereof I affix my signature in presence of two witnesses.

MARION LE ROY BILLINGS.

Witnesses:
F. H. Koos,
L. C. Enders,